United States Patent [19]
Staehlin et al.

[11] 3,953,011
[45] Apr. 27, 1976

[54] VEHICLE SHOCK ABSORBER

[76] Inventors: Paul M. Staehlin, 9307 S. McVickers, Chicago, Ill. 60453; William Nicholas, 1415 W. Pratt Blvd., Chicago, Ill. 60626

[22] Filed: Dec. 6, 1974

[21] Appl. No.: 530,075

[52] U.S. Cl. ............................... 267/48; 180/24.02
[51] Int. Cl.² ........................................... F16F 1/22
[58] Field of Search .................... 267/48; 170/24.02

[56] References Cited
UNITED STATES PATENTS
1,981,593  11/1934  Fageol ............................ 180/24.02

FOREIGN PATENTS OR APPLICATIONS
921,250  12/1954  Germany ......................... 180/24.02

*Primary Examiner*—James B. Marbert
*Attorney, Agent, or Firm*—Richard J. Myers

[57] ABSTRACT

A vehicle shock absorber is provided and includes a cylindrical shaped housing rotatably mounted on a central sleeve on a shaft on a vehicle body. A shock absorber band which assumes a circular shape in the form of a leaf spring is disposed around the inside of the housing periphery. One end of the shock absorber leaf spring may be fixedly attached on the housing inner periphery; the other end of the shock absorber spring is connected to a flexible chain passing around a roller in the housing and connecting with a rotatable sleeve which has a cam surface about which the chain can be wound. An elongated steel leaf spring is connected by a flexible belt to both the outer periphery of the housing and to a wheel and axle means. The chain winding sleeve is rotated about its associated shaft for adjusting the tension on the belt for proper shock absorber cushioning effect. The cylindrical shaped housing is held on the supporting sleeve by an adjusting and locking nut.

5 Claims, 4 Drawing Figures

U.S. Patent   April 27, 1976   3,953,011
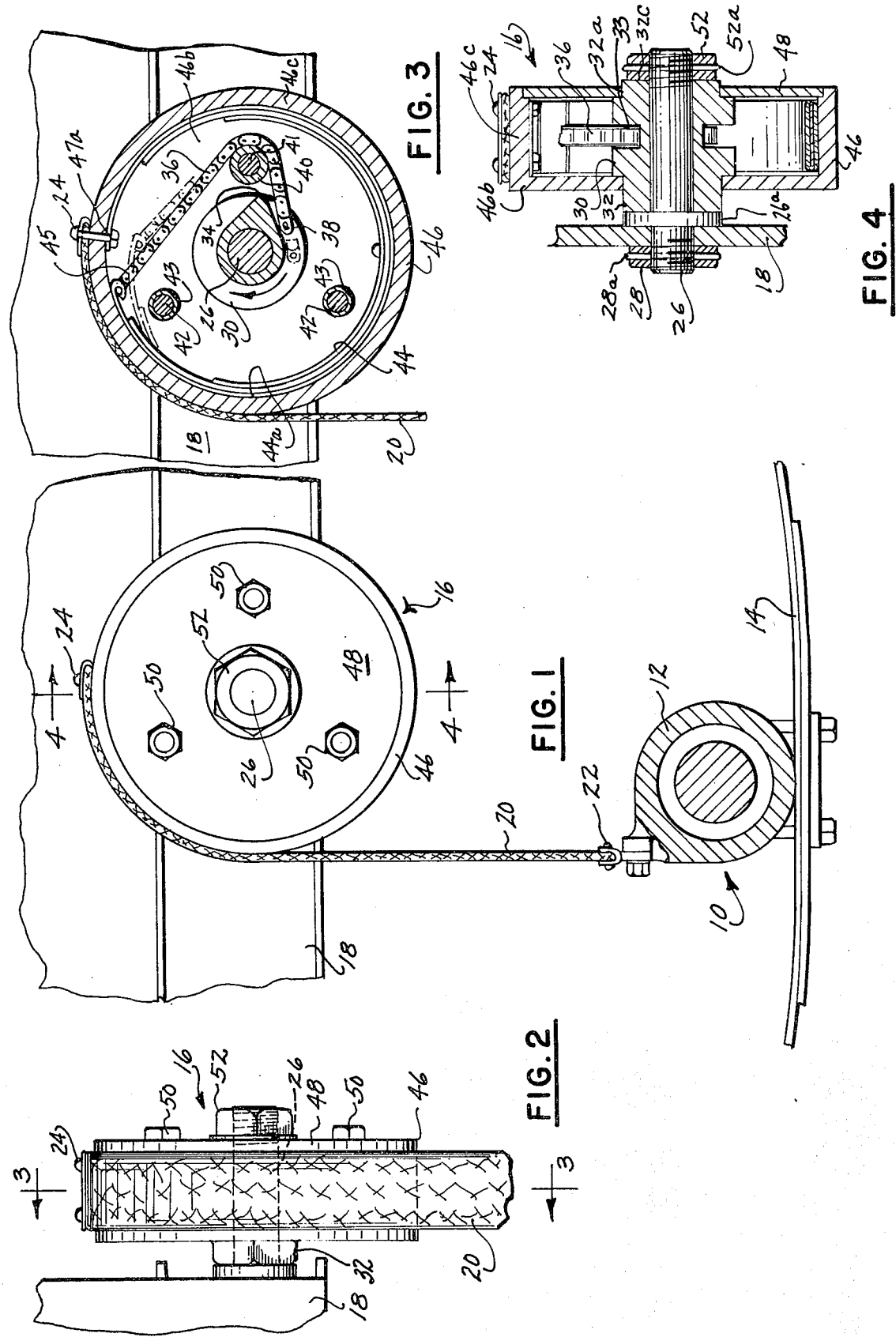

VEHICLE SHOCK ABSORBER

BACKGROUND OF THE INVENTION

1. Field of the Invention

This invention relates improvements in devices generally known as shock absorbers which are used in connection with vehicles to reduce the undesirable reaction of a vehicle's springs when they are caused to exceed their normal degree of deflection by any excessive increase in the amplitude of the vertical movements between the body of such vehicle and the supporting axles due to rough or uneven roadways.

2. Description of the Prior Art

Vehicle shock absorbers are well known in the art. In common use today is the piston and air cylinder or hydraulic type of shock absorber cushion unit. Such fluid units rely on sealing structure and tolerances between the cylinder and movable piston. Any leakage of fluid impedes the shock absorber and subsequent friction between the moving parts causes wear and ultimate part failure. Thus it is desirable to provide a shock absorber free from fluid leakage and the associated friction. Such problems are overcome with this invention. A tension spring and an interconnected variable lever between the vehicle body and the vehicle axle is a desirable way. this arrangement is shown for instance by U.S. Pat. Nos. 1,170,457 and 1,562,785. However, compactness of the shock absorber is desired. Also the shock absorber should be constructed to be tension adjustable for good shock absorber "feel" and have its components all wind up in one rotating direction and unwind in the opposite rotating direction for smoothness of operation and quick response. Also it is desirable to have a more convenient and compact assemblege of the shock absorber components for mounting of the absorber on the vehicle. It is these desirable features that the invention incorporates.

SUMMARY

It is a general object of this invention to provide an improved vehicle shock absorber which incorporates spring means and leverage structure in a compact arrangement for quick response functioning under road impacts.

A further object of this invention is to provide a shock absorber of the spring wind up type as aforesaid wherein lever means is responsive to a circular spring surrounding the lever means, and the leverage of lever means varies in response to the intensity of the load on impact on the vehicle suspension springs.

The invention further provides that the connector or strain conductor between the vehicle axle and the shock absorber is flexibly connected to the outside of the abosrber housing in which the shock absorber spring is fixedly located, and lever means being rotatably disposed within the absorber spring on a central housing shaft to provide for a unidirectional or clockwise wind up and includes a motive conductor in the form of a flexible member about a sleeve and cam that acts as a variable lever arm.

The invention further provides for a shock absorber arrangement that may be adjusted to provide a desired shock absorber "feel" and held to certain resiliency by a clamping structure.

Further a novel shock absorber housing and lever mounting arrangement is provided by this invention.

A still further object of the invention is to provide for a shock absorber arrangement as aforesaid wherein the lever means utilizes a flexible member or chain that is wrapped about a lever sleeve rotatably supported on a central shaft of a housing containing the chain to achieve the wind up action of the shock absorber when the inner circular leaf spring inside the absorber housing and the outer elongated leaf spring outside of the absorber housing have the loading on them reduced.

Still another object of the invention is to provide a shock absorber as aforesaid that has a connection of the internal circular spring in the housing with the central housing shaft which leaves space for bolting of the housing parts about such spring and central shaft.

These and other objects and advantages will become apparent by reference to the following description, appended claims and attached drawings.

BRIEF DESCRIPTION OF THE DRAWINGS

FIG. 1 is a side elevational view of the novel shock absorber arrangement mounted between the body and the axle of a vehicle;

FIG. 2 is an elevational view of the shock absorber unit shown in FIG. 1;

FIG. 3 is a sectional view taken along lines 3—3 of FIG. 2; and

FIG. 4 is a sectional view taken along line 4—4 of FIG. 1.

DESCRIPTION OF THE PREFERRED EMBODIMENT

With reference now to the drawings and in particular with reference to FIG. 1, there is shown an unsprung mass in the form of a vehicle wheel and axle assembly 10 which includes a wheel housing 12 to which is connected a standard horizontally extending vehicle or automobile leaf spring assembly 14. A shock absorber unit 16 which is cylindrical in shape or wheellike is mounted for movement on the vehicle body 18. The shock absorber unit 16 is attached to the wheel and axle assembly 10 by a strain conductor or flexible belt 20 which is a vertically extending elongated steel webbing or other similar member. The flexible belt 20 is fastened to the wheel and axle assemble 10 at location 22 and is wrapped around the shock absorber unit 16 and fastens thereto at location 24.

Referring now to FIGS. 2, 3 and 4 it is noticed that the cylindrical shaped shock absorber unit 16 is slidably assembled onto the threaded mounting body stud or shaft 26 which is permanently mounted to the vehicle body 18 by threaded nut 28. To adjust the tension in the flexible belt 20, a cam roller or central lever sleeve 30 is turned with a wrench at the reduced section 32 of the sleeve 30 in a clockwise direction as indicated in FIG. 3. The sleeve or roller 30 has a central reduced or grooved portion 33 in which is located the chain wind up member or lever 34 in the form of a cam. The cam 34 contacts a motive conductor 36 in the form of a roller chain which is fastened to the cam roller 34 at the chain pivot member 38 located in the roller groove 33. The cam member 34 is pointed or cone shaped and allows the flexible link chain 36 to be wrapped in a clockwise direction as shown by the arrow in FIG. 3. As the wrench section 32 is turned by a wrench, the link chain 36 wrapped into the groove portion 33 of the cam roller 30 and moves around the chain guide roller or sleeve 40 that is positioned on mounting stud 41. The shock absorber unit 16 is provided with two other mounting studs 42 that merely have thinner protective sleeves 43 on them because the chain 36 does not wrap around these studs 42.

The other end 45 of the chain 36 is pivotally attached to the resilient means or spring assembly 44 which is nested in the unit housing 46. The spring assembly 44 is a curved leaf spring arrangement and lies along the inner peripheral surface or inside 46a of the housing 46. The unit housing 46 is a generally cupshaped having wall portions 46b and 46c. The other end of the leaf spring assembly 44 is fastened to the unit housing 46 at 47a and 24. A cover plate 48 fits snugly into the cut out ends of housing section 46c of the housing 46 and is fastened to the mounting studs 41 and 42 by nuts 50. The central section of the cam groove portion 33 is actually raised (see FIG. 4) relative to sections 32 and 32a to provide shoulders for the housing section 46b and the cover plate 48. The unit housing 46 and the cover plate 48 are rotatable on cam roller 30. The shaft part of stud 26 is provided with an enlarged annular flange 26a of greater diameter than the rest of the shaft.

When the flexible belt 20 is tightened sufficiently to bias, or place in preset tension, spring 44 adequately to the proper shock absorber "feel", clamping nut 52 is tightened with one wrench while a second wrench engages wrench section 32 thus holding the shaft 26 and cam roller 30 as a fixed unit and constrained for movement together with the result that the shock absorber unit is in a position to operate. The nuts 28 and 52 with their lock pins 28a and 52a respectively in cooperation with flange 26a hold the shock assembly members against the body 18 and permit only the housing 46 and its cover plate 48 to rotate on the fixed cam 30 and shaft 26. It will be appreciated that the shock absorber unit may have its spring 44 fixed in greater or lesser tension depending how much give or bounce is desired in the unit. The dot dash line in FIG. 3 shows the chain 36 pulled further around the cam 34 because of less load on the belt 20 as when the wheel and axle assembly and body came closer to one another, for instance when the car rides over a bump in the road. The reaction of the car after hitting the bump causes the wheel and axle assembly 10 and the body 18 to separate further from one another and therefore the cam 30 and chain 36 assume a different or displaced position to that shown in solid line in FIG. 3. The solid line position of the parts in FIG. 3 tend to show the at rest condition of the vehicle, for instance when the vehicle is parked. Severe bumps would cause additional resultant vertical separation of the wheel from the body than even the spring and chain condition shown in FIG. 3.

Thus what is provided is a vehicle body mounted shock absorber of the spring wind up type which uses lever means in the form of a sleeve and a flexible chain attached to a circular band or leaf spring within a cylindrical housing having an external band connected to the vehicle wheel and axle assembly. The housing 44 and cover plate 48 rotate on a central hub that surrounds and is carried on the cam roller 30 which in turn has a central bore which surrounds and is supported by the stud or shaft 26 which rotates relative to the cam roller until the nuts 26 and 52 are tightened when the desired shock absorber "feel" having been determined. The length and effect of the lever means varies with the load and road conditions and provides for a unidirectional or clockwise wind up of the shock absorber unit. Bolting of the shock absorber unit together occurs in space provided for in the absorber housing.

The foregoing description and drawings merely explain and illustrate the invention and the invention is not limited thereto, except insofar as the appended claims are so limited, as those who are skilled in the art have the disclosure before them will be able to make modifications and variations therein without departing from the scope of the invention.

What is claimed is:

1. A shock absorber being adapted to be mounted on a vehicle between the body and the axle comprising,
    shaft means adapted to be mounted on the vehicle body,
    lever means including a roller sleeve rotatively supported on said shaft means and cam means carried by said roller sleeve and a flexible elongated motive conductor having a first end mounted on the roller sleeve and engageable with said cam means,
    a housing surrounding said shaft means and said lever means and rotatively supported on said lever means,
    resilient means being attached to said housing,
    said flexible motive conductor having a second end being attached to said resilient means,
    an elongated strain conductor having a first end being attached to and around the periphery of said housing and having a second end adapted to be attached with the vehicle axle, whereby said motive conductor, said resilient means and said strain conductor are concurrently placed in greater tension in one rotative direction than in the opposite rotative direction, and
    means for constraining said roller sleeve against rotation on said shaft means,
    said resilient means including arcuate shaped spring means engaging in an arcuate path about the inner periphery of the housing.

2. A shock absorber being adapted to be mounted on a vehicle between the body and the axle comprising,
    shaft means adapted to be mounted on the vehicle body,
    lever means including a roller sleeve rotatively supported on said shaft means and cam means carried by said roller sleeve and a flexible elongated motive conductor having a first end mounted on the roller sleeve and engageable with said cam means,
    a housing surrounding said shaft means and said lever means and rotatively supported on said lever means,
    resilient means being attached to said housing,
    said flexible motive conductor having a second end being attached to said resilient means,
    an elongated strain conductor having a first end being attached to and around the periphery of said housing and having a second end adapted to be attached with the vehicle axle, whereby said motive conductor, said resilient means and said strain conductor are concurrently placed in greater tension in one rotative direction than in the opposite rotative direction, and
    means for constraining said roller sleeve against rotation on said shaft means,
    a vehicle body and axle in combination with said shock absorber, said shock absorber shaft means being mounted on a wall of the body and said strain conductor second end being attached to the axle, and said
    means for constraining said roller sleeve including means for placing said resilient means in tension and including nut means on the shaft means frictionally engaging the sleeve and holding same against rotation after said resilient means has been placed in tension on the vehicle rotation of the sleeve relative to the shaft means.

3. The invention according to claim 2, and said nut means including a first nut on the shaft means on one face of the roller sleeve, said wall being adjacent the other face of the roller sleeve and a second nut and the other sleeve face, said nuts being tightened against the one face and the wall.

4. The invention according to claim 2, and said roller sleeve having a wrench engaging face for rotating said sleeve on said shaft to place said resilient means in tension.

5. The invention according to claim 3, and said shaft means having a flange interposed between said wall and the other face.

* * * * *

UNITED STATES PATENT AND TRADEMARK OFFICE
CERTIFICATE OF CORRECTION

PATENT NO. : 3,953,011
DATED     : April 27, 1976
INVENTOR(S) : Paul M. Staehlin, et al It is certified that error appears in the above-identified patent and that said Letters Patent is hereby corrected as shown below:

On the Title page, Item [76] should read as follows:

-- Inventors:  Paul M. Staehlin, 9307 S. McVickers,
               Oak Lawn, Ill. 60453;
               William Nicholas, 1415 W. Pratt Blvd.,
               Chicago, Ill. 60626--.

Signed and Sealed this

Tenth Day of August 1982

[SEAL]

Attest:

GERALD J. MOSSINGHOFF

Attesting Officer      Commissioner of Patents and Trademarks